(12) United States Patent
Allen

(10) Patent No.: US 8,770,042 B2
(45) Date of Patent: Jul. 8, 2014

(54) ULTRASONIC FLOW METER HAVING CABLE SHROUD

(75) Inventor: Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 222 days.

(21) Appl. No.: 13/434,492

(22) Filed: Mar. 29, 2012

(65) Prior Publication Data

US 2012/0247225 A1 Oct. 4, 2012

Related U.S. Application Data

(60) Provisional application No. 61/470,878, filed on Apr. 1, 2011.

(51) Int. Cl.
*G01F 1/20* (2006.01)

(52) U.S. Cl.
USPC .................................................... 73/861.18

(58) Field of Classification Search
USPC .............................. 73/861.18, 861.12, 861.79
See application file for complete search history.

(56) References Cited

U.S. PATENT DOCUMENTS

| 4,012,957 | A | * | 3/1977 | Chiles et al. | 73/861.82 |
|---|---|---|---|---|---|
| 4,030,359 | A | * | 6/1977 | Stapler | 73/861.92 |
| 4,121,454 | A | * | 10/1978 | Cushing | 73/861.12 |
| 4,297,900 | A | * | 11/1981 | Brandt, Jr. | 73/861.66 |
| 4,308,754 | A | | 1/1982 | Pedersen et al. | |
| 4,375,769 | A | * | 3/1983 | Brandt, Jr. | 73/861.66 |
| 4,462,264 | A | * | 7/1984 | Feller | 73/861.18 |
| 4,507,975 | A | | 4/1985 | Bittner et al. | |
| 4,770,035 | A | * | 9/1988 | Kolkebeck et al. | 73/195 |
| 5,370,001 | A | * | 12/1994 | LaBrecque et al. | 73/861.353 |
| 5,509,305 | A | * | 4/1996 | Husain et al. | 73/195 |
| 5,728,950 | A | * | 3/1998 | Boulanger | 73/861.79 |
| 5,728,951 | A | * | 3/1998 | Van Cleve et al. | 73/861.354 |
| RE36,401 | E | * | 11/1999 | Fitzpatrick et al. | 73/300 |
| 6,220,103 | B1 | * | 4/2001 | Miller et al. | 73/861.22 |
| 6,904,811 | B2 | | 6/2005 | Ehrlich et al. | |
| 7,287,437 | B2 | * | 10/2007 | Kroemer et al. | 73/861.25 |
| 7,343,795 | B2 | * | 3/2008 | Winter | 73/275 |
| 7,397,168 | B2 | | 7/2008 | Straub, Jr. et al. | |
| 7,628,081 | B1 | | 12/2009 | Feller | |
| 8,516,901 | B2 | * | 8/2013 | Kroemer et al. | 73/861.25 |
| 2005/0039546 | A1 | * | 2/2005 | Payne et al. | 73/861.79 |

(Continued)

FOREIGN PATENT DOCUMENTS

FR 2150630 A1 4/1973
GB 2203546 A 10/1988

(Continued)

OTHER PUBLICATIONS

PCT/US2012/030725 International Search Report and Written Opinion dated Oct. 16, 2012 (10 p.).

(Continued)

*Primary Examiner* — Jewel V Thompson
(74) *Attorney, Agent, or Firm* — Conley Rose, P.C.

(57) ABSTRACT

A flow meter is presented having a meter body that is enveloped by a compliant shroud that protects transducers and transducer cables. The shroud forms a chamber between the shroud and meter body, and includes a releasable portion to allow access into the chamber.

28 Claims, 10 Drawing Sheets

(56) References Cited

U.S. PATENT DOCUMENTS

| | | |
|---|---|---|
| 2007/0035211 A1 | 2/2007 | Straub, Jr. et al. |
| 2009/0174514 A1 | 7/2009 | Allen |
| 2011/0162460 A1 | 7/2011 | Allen et al. |
| 2011/0162461 A1 | 7/2011 | Allen |
| 2011/0162462 A1 | 7/2011 | Allen |

FOREIGN PATENT DOCUMENTS

| | | |
|---|---|---|
| JP | 2004226394 A | 8/2004 |
| JP | 2010107406 A | 5/2010 |
| WO | 2009/023528 A1 | 2/2009 |

OTHER PUBLICATIONS

"Ultrasonic Gas Flow Meter Operates Under High Pressure," ThomasNet News, Jul. 27, 2004, http://news.thomasnet.com/fullstory/Ultrasonic-Gas-Flow-Meter-operates-under-high-pressure-453897, accessed Nov. 28, 2012, (1 p.).

"TotalSonic 900 Software Manual," ABB, Inc., Totalflow Products, Bartlesville, Oklahoma, www.totalflowsupport.com/Manuals-PDF/Totalsonic%20software.PDF, accessed Nov. 28, 2012, (52 p).

PCT/US2011/020289 International Search Report and Written Opinion Dated Aug. 18, 2011 (9 p.).

PCT/US2011/020106 International Search Report and Written Opinion Dated Aug. 18, 2011 (9 p.).

U.S. Notice of Allowance Dated Jan. 19, 2012; U.S. Appl. No. 12/683,036 (10 p.).

Chinese Office Action Dated Dec. 5, 2013; Chinese Application No. 201180008134.2 (7 p.).

European Search Report Dated May 29, 2013; European Application No. 11732047.3 (7 p.).

Response to European Search Report Dated May 29, 2013; European Application No. 11732047.3; Response Dated Dec. 19, 2013 (16 p.).

Russian Decision to Grant Dated Dec. 17, 2013; Russian Application No. 2012129946 (23 p.).

* cited by examiner

ULTRASONIC FLOW METER HAVING CABLE SHROUD

CROSS-REFERENCE TO RELATED APPLICATIONS

This application claims benefit of U.S. provisional patent application Ser. No. 61/470,878 filed Apr. 1, 2011, and entitled "Ultrasonic Flow Meter Having Cable Shroud," which is hereby incorporated herein by reference in its entirety.

STATEMENT REGARDING FEDERALLY SPONSORED RESEARCH OR DEVELOPMENT

Not applicable.

BACKGROUND

1. Field of Technology

This disclosure relates generally to liquid and gas ultrasonic flow meters. More particularly, it relates to an apparatus and system for protecting cables extending from ultrasonic flow meters.

2. Background Information

Hydrocarbons, in both liquid and gas phases, are transported from place to place via pipelines. It is desirable to know with accuracy the amount of fluid flowing in the stream, and particular accuracy is demanded when the fluid is changing hands, or during "custody transfer." Even where custody transfer is not taking place, measurement accuracy is desirable, and in these situations, ultrasonic flow meters are commonly used.

An ultrasonic flow meter typically includes two or more transducer assemblies, each secured inside of a dedicated port in the body of the flow meter. The body of the flow meter may also be referred to as a spool piece. To seal the transported fluid within the flow meter, a connector is secured over the exterior end of each transducer port in the spool piece. Thus, the spool piece and end connectors create a sealed housing and pressure boundary that contains the fluid that is flowing through the meter.

To measure fluid flow through the meter, a pair of transducer assemblies is positioned such that the piezoelectric elements of the transducers are adjacent to the inner surface of the spool piece, and such that each transducer of the pair faces the other of the pair that is positioned on opposite sides of the fluid-carrying bore of the spool piece. The transducer assemblies transmit and receive electric signals back-and-forth across the fluid stream.

Each transducer assembly is coupled to a cable that extends through the end connector to the exterior of the spool piece, and to a remote location, typically an electronics enclosure mounted on or adjacent to the spool piece. The electric signals created by the piezoelectric element of the particular transducer assembly is carried by the cable to an acquisition circuit board housed within the electronics enclosure, where the signal may be processed and subsequently used to determine the fluid flow rate through the meter.

Typically, the transducer cables are run to the electronics enclosure along the outer surface of the spool piece, where they remain constantly exposed to weather and sunlight, which can degrade the cables' insulation. Left exposed, the cables are also susceptible to being tampered with and to becoming damaged by causes such as falling debris, livestock contacting or eating the cables, and vandals. Further, left unprotected, the cables and transducers are exposed to possible damage during shipping and installation. Consequently, it is common to employ robust and thus relatively expensive such cables in an attempt to resist damage and degradation.

Some attempts have been made to manufacture meter bodies having internal cable passageways that are formed in the walls of the meter body to at least partially cover the cables and to provide some degree of protection. In some such products, the ends of the transducer assemblies and portions of the cables are nevertheless still exposed and thus susceptible to damage. Further, although the cables may be partially covered, access to the transducer assemblies in such products is not prevented, such that the transducer assemblies may be tampered with, with no indication that such tampering has taken place. Tampering with transducers and cable connections may disable the meter completely, or alter the meter's performance in accurately measuring fluid flow.

Accordingly, there remains a need in the art for a flow meter in which transducers and transducer cables are protected from damage, but where the cables and transducers are readily accessible so service can be provided when required.

SUMMARY OF THE DISCLOSURE

In one embodiment, a flow meter includes: a meter body; a shroud disposed about the meter body; a chamber between the shroud and the meter body; and an enclosure for housing electronics coupled to the meter body. A first shroud portion is disposed between the enclosure and the meter body and a second shroud portion is releasably attached to the first shroud portion. The meter may include a transducer and a transducer cable extending from the transducer into the enclosure and disposed through aligned apertures in the enclosure and the shroud. The shroud portions may be made of a compliant material, such as sheet metal. The meter may include an anti-tamper seal coupled to at least one of the shroud portions to provide an observable indication upon the shroud portions becoming unattached.

In another embodiment, a flow meter includes: a meter body; a compliant cover enveloping the meter body and including a first and second aperture generally coaxially aligned, wherein the meter body extends through the apertures. The compliant cover includes at least a first portion coupled to the meter body. The meter body may include grooves, with the curved edges of the cover's apertures received in the grooves. Further, the shroud may include mitered corners adjacent end panels, and have an 8-sided shape when viewed from above.

In another embodiment, a flow meter includes: a meter body; a shroud disposed about the meter body and having at least a first shroud portion and a second shroud portion. The first shroud portion is coupled to the meter body. The second shroud portion is coupled to the first shroud portion and is movable between a first position in which the shroud forms a closed chamber, and a second position in which the chamber includes an access opening. The meter may also include removable fasteners attaching together the first and second shroud portions and an anti-tamper seal provide an observable indication upon the first and second shroud portions becoming unattached.

In another embodiment, a flow meter includes a meter body and a pair of circumferential grooves of radius R spaced apart on the outer surface. The flow meter further includes: a shroud assembly disposed about the body, a chamber between the shroud assembly and the meter body; and a transducer coupled to the meter body and including a cable extending into the chamber. The shroud assembly includes two portions, each having a first curved edge of radius R disposed in the first groove, and a second curved edge of radius R disposed in the second groove.

In various embodiments, the shroud assembly includes mitered corners adjacent to the locations where transducers are coupled to the meter body.

In various embodiments, a least one of the shroud portions may be formed from a unitary piece of sheet metal.

In various embodiments, a transducer cable may include a connector positioned between the shroud and the meter body and accessible upon the first and second shroud portions being separated.

Thus, embodiments described herein comprise a combination of features intended to address various shortcomings associated with certain prior devices, systems, and methods. The various features and characteristics described above, as well as others, will be readily apparent to those skilled in the art upon reading the following detailed description, and by referring to the accompanying drawings.

BRIEF DESCRIPTION OF THE DRAWINGS

For a detailed description of the disclosed embodiments of the invention, reference will now be made to the accompanying drawings in which.

DETAILED DESCRIPTION OF DISCLOSED EMBODIMENTS

Figure 1:
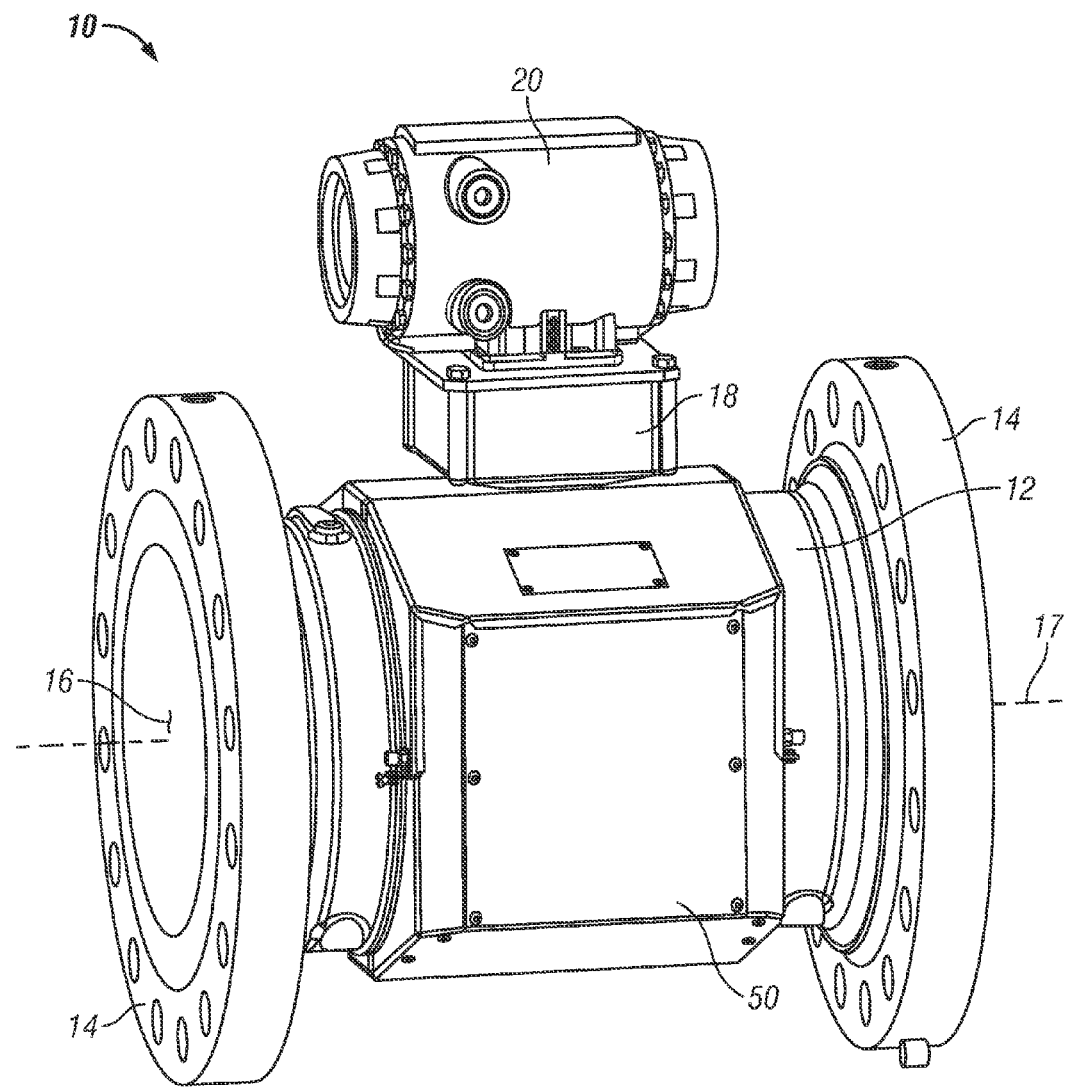
FIG. 1 is a perspective view of a fully-shrouded, ultrasonic flow meter made in accordance with principles described herein.

The following description is exemplary of embodiments of the invention. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections.

Figure 13:
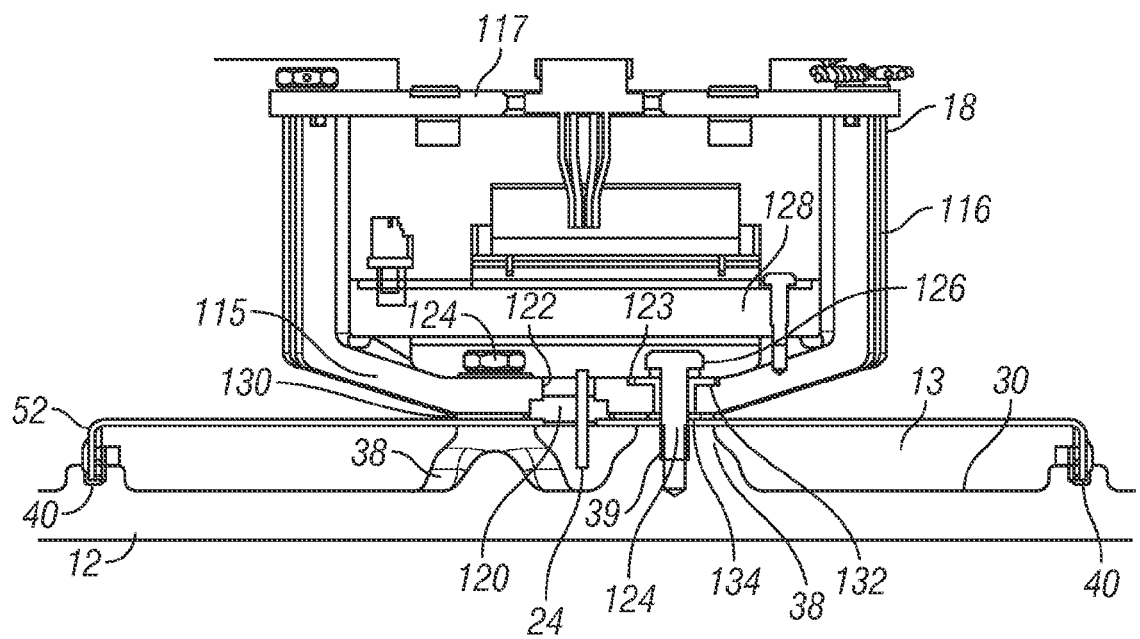
FIG. 13 is an enlarged, elevation view, partly in cross-section, showing the lower electronics housing coupled to the top sub-assembly of the shroud for the meter shown in FIG. 1.
Figure 15:
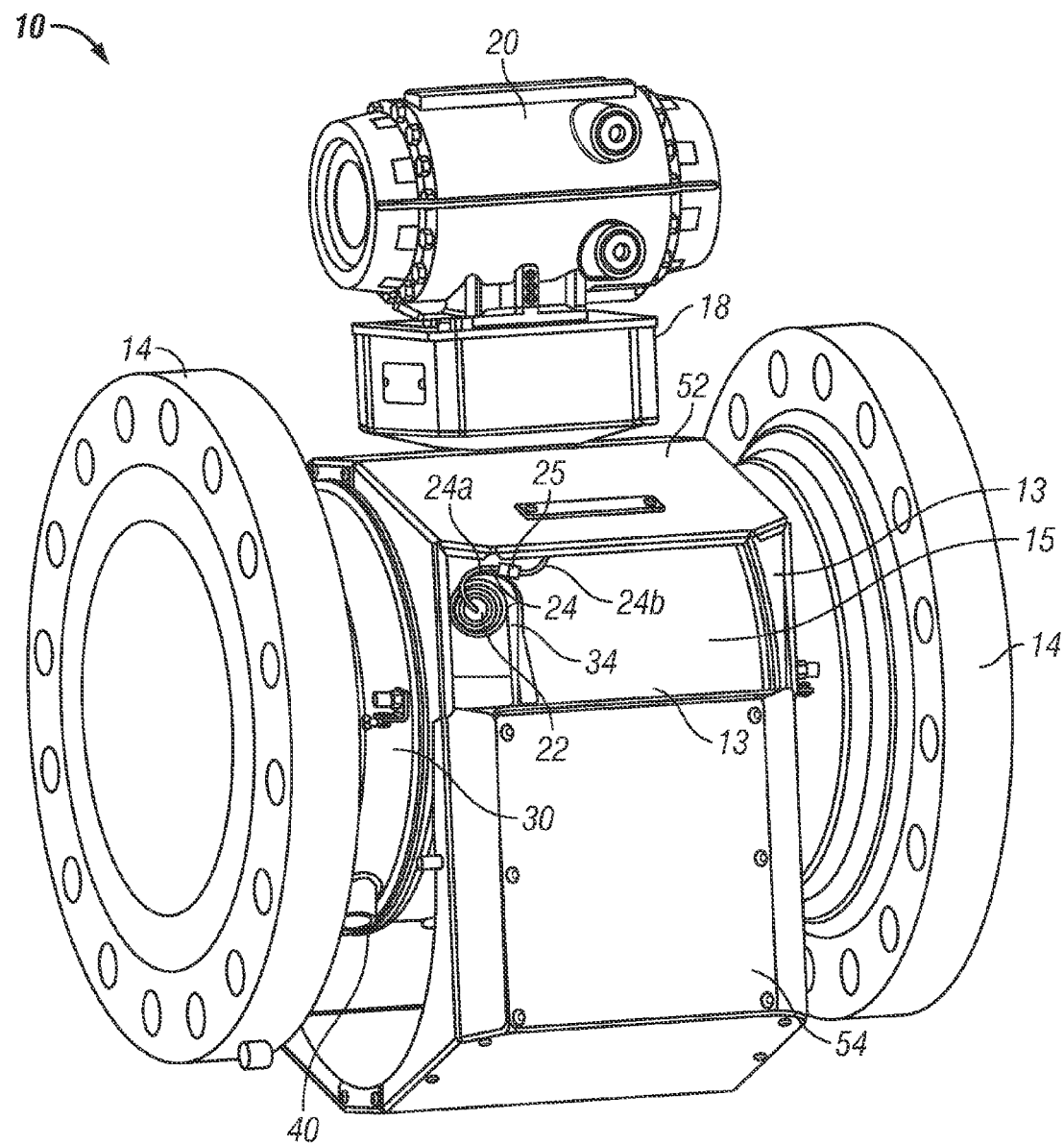
FIG. 15 is a perspective view of the flow meter of FIG. 1 shown with the bottom shroud sub-assembly partially disengaged from the top shroud sub-assembly and with the cable chamber thus opened.

Referring first to FIG. 1, an ultrasonic flow meter 10 includes a meter body or spool piece 12 suitable for placement between aligned sections of a pipeline. Body 12 includes a pair of flanges 14 that are adapted for connection to corresponding flanges on the pipeline sections. Body 12 includes a longitudinal axis 17 and a central flow passage 16 through which a fluid (e.g., gas and/or liquid) flows and can be measured. Typically, body 12 is cast, and then machined to its final form; however, it may be formed by any suitable manufacturing technique. In this embodiment, flow meter 10 further includes a lower electronics housing 18 disposed on top of body 12, and an upper electronics housing 20 disposed atop lower housing 18. Although not shown in FIG. 1, flow meter 10 further includes transducer assemblies 22 that are electrically coupled to circuitry within lower electronics housing 18 via cables 24 (FIGS. 13, 15). Cables 24 may include connectors 25 which essentially divide cable 24 into segments 24a and 24b (FIG. 15). Any commercially-available transducer assembly may be suitable in the present application. For brevity, "transducer assembly" may be referenced herein simply as "transducer". As explained further below, a cable shroud 50 completely surrounds body 12 and encloses transducer cables 24 within an annular chamber 13 (FIG. 15) that is formed between shroud 50 and body 12.

Figure 2:
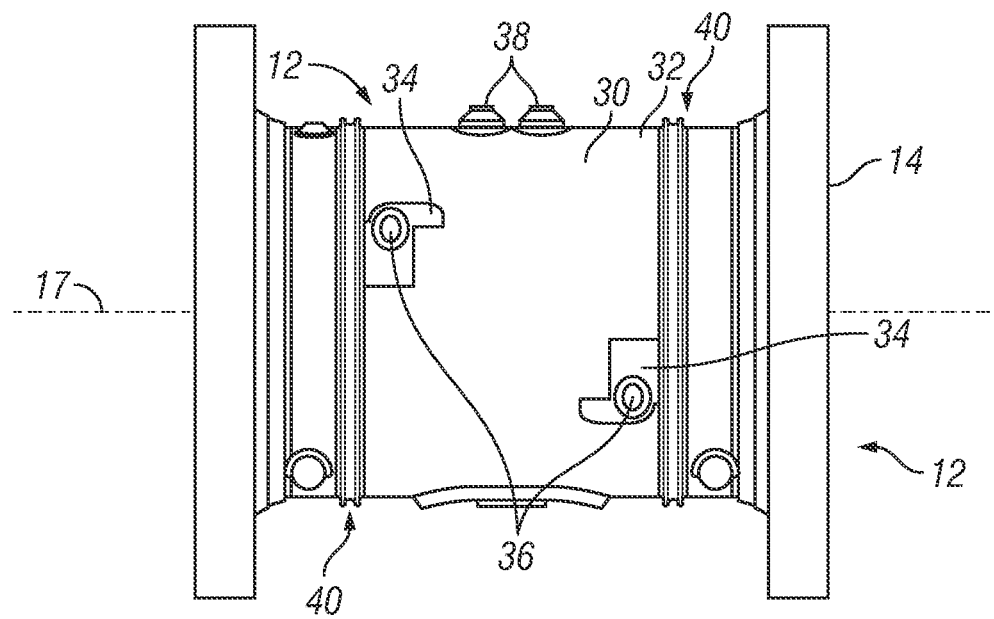
FIG. 2 is a side elevation view of the meter body of the shrouded meter of FIG. 1, shown without the shroud in place.
Figure 3:
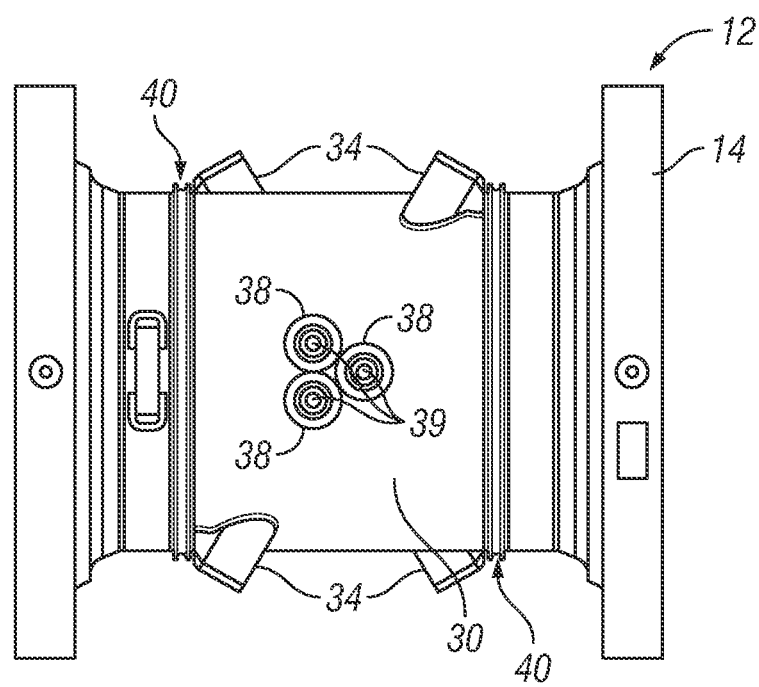
FIG. 3 is a top view of the meter body shown in FIG. 2.

Referring to FIGS. 2 and 3, body 12 is shown to generally include tubular portion 30 having a generally cylindrical outer surface 32 extending between flanges 14. Extending from surface 32 are transducer bosses 34 (four shown in this embodiment) having threaded ports 36, each port for receiving a transducer 22 (FIG. 15). Each port 36 extends between central flow passage 16 and cylindrical outer surface 32 of body 12. The top portion of tubular section 30 further includes three bosses 38 having threaded bores 39 (FIG. 13) for receiving fasteners (described below) connecting the lower electronics housing 18 to body 12. Bosses 38 are formed to have relatively planar upper surfaces and so that their upper surfaces themselves lie in the same plane to provide a level support for top shroud portion 52 and electronics housing 18. As best shown in FIG. 3, bores 39 and bosses 38 are asymmetrically positioned such that lower electronics housing 18 can be attached to meter body 12 in only one orientation. This helps insure that, during installation, the transducers 22 and their respective cables are coupled to the proper circuit board within housing 18.

Tubular section 30 of body 12 further includes a pair of annular grooves 40. Grooves 40 encircle tubular section 30 and each groove is axially positioned between a transducer boss 34 and flange 14. Grooves 40 can be formed on body 12 in various ways. For example, the grooves may be formed in the initial casting of the tubular portion 30 of the body 12. Alternatively, body 12 may instead be cast with a raised ring having an outwardly-facing cylindrical surface, with the groove 40 thereafter being machined into the outwardly-facing cylindrical surface. In any case, the width of groove 40 is slightly larger than the thickness of the material forming cable shroud 50. In the embodiment shown, the groove is made to be approximately twice the thickness of the sheet metal used to form shroud portions 52, 54.

Figure 4A:
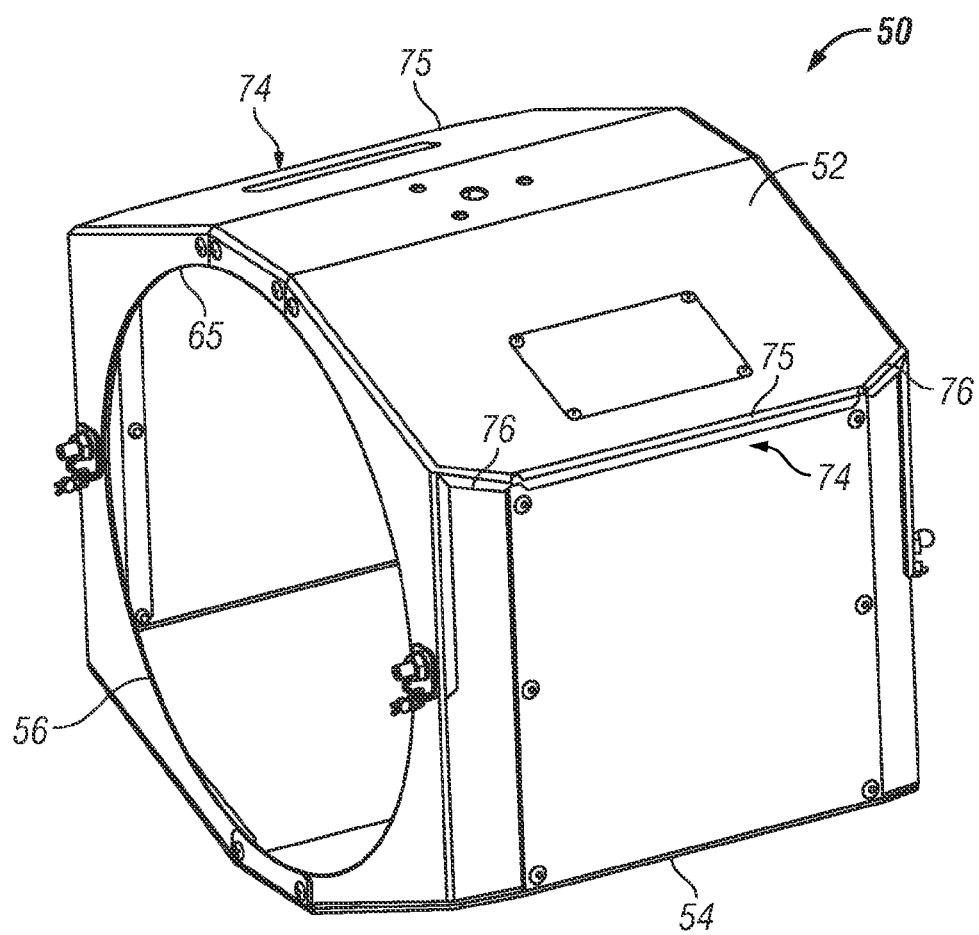
FIG. 4A is a perspective view of the shroud assembly of the meter of FIG. 1.
Figure 4B:
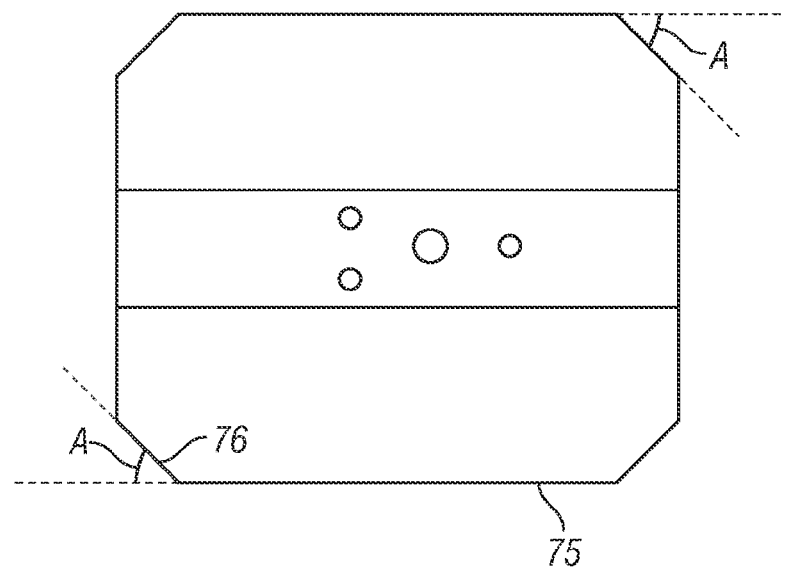
FIG. 4B is a top view of the shroud assembly shown in FIG. 4A.

Referring to FIGS. 4A and 4B, cable shroud 50 has a box-like configuration that, as described below, has an 8-sided and non-rectangular profile or shape when viewed from either of two angles that are orthogonal to each other. Shroud 50 includes two axially-aligned circular openings 56 for receiving the tubular portion 30 of meter body 12 that extends through openings 56. Cable shroud 50 includes a top shroud portion 52 and a bottom shroud portion 54. In the embodiment shown in FIG. 4A, top shroud portion 52 and bottom shroud portion 54 are each made of sheet metal, such as 16 gauge stainless steel approximately 0.06 inches thick, such that, once coupled together, the portions 52, 54 form a compliant cover enveloping meter body 12. Other materials may be employed for cable shroud 50, including other steels and alloys, aluminum and plastic, for example.

Figure 5:
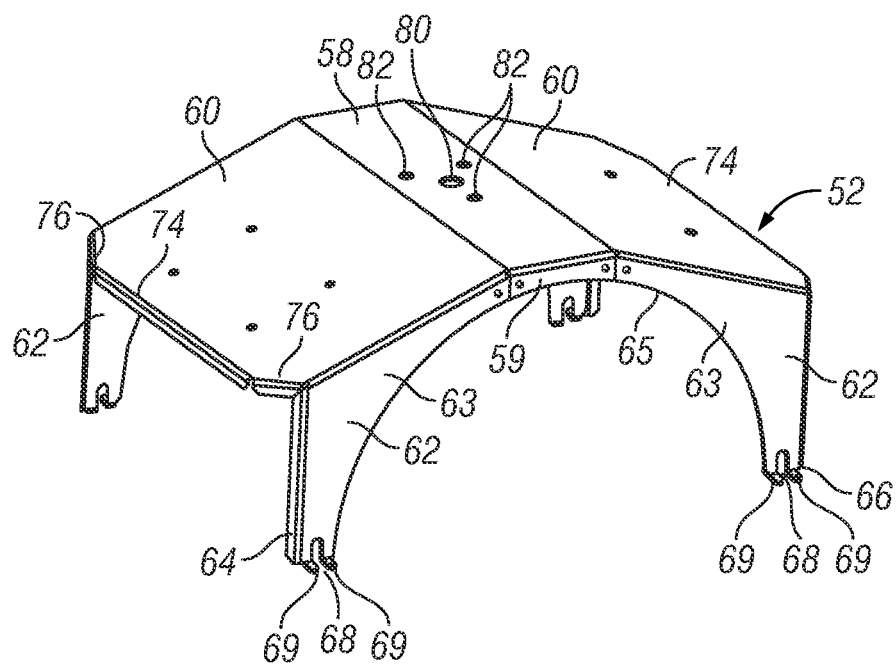
FIG. 5 is a perspective view of the top sub-assembly of the shroud assembly shown in FIG. 4A.
Figure 7:
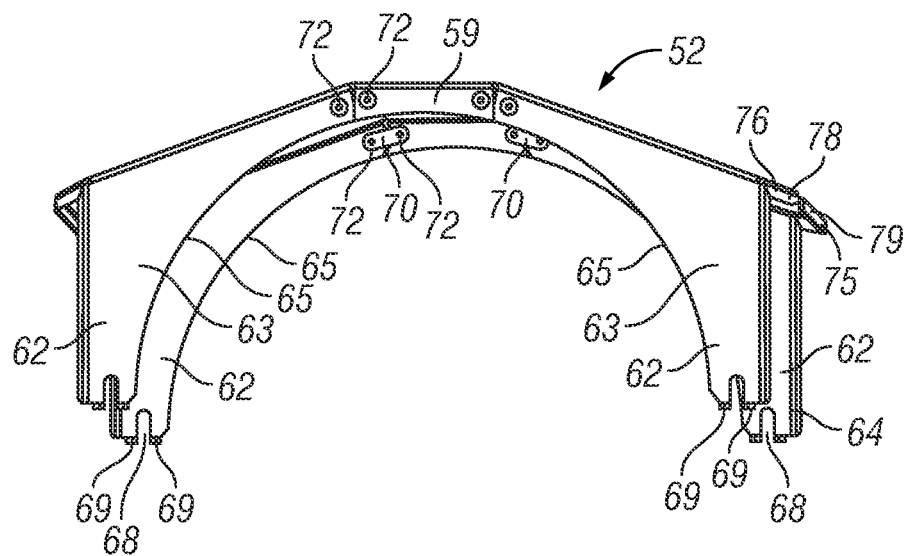
FIG. 7, similar to FIG. 5, is another perspective view of the top sub-assembly of the shroud assembly shown in FIG. 4A, and showing bracing members.

As best shown in FIGS. 5 and 7, top shroud portion 52 includes a central portion 58, two sloping portions 60 connected to central portion 58 and sloping away from central portion 58 at an angle equal to approximately 20°. Top shroud portion 52 further includes two leg members 62 extending downwardly from each sloping portion 60. Each leg member 62 includes a generally planar facing surface 63 and an edge portion 64 that extends at right angles from facing surface 63. Central portion 58 includes a downwardly extending lip 59 that is substantially planar with the facing surface 63 of leg 62. Collectively, facing surfaces 63 and lip 59 form a semicircular edge 65 and one-half of circular opening 56. Legs 62 terminate in leg ends 66 that include a central notch 68 and a pair of tabs 69 disposed at right angles to facing surface 63.

As best shown in FIG. 7, to provide a desired measure of rigidity, top shroud portion 52 includes reinforcing braces 70 that are disposed against lip 59 and facing surface 63 of leg 62 and fastened to those surfaces via fasteners, such as rivets 72.

Referring again to FIGS. 4A, 5 and 7, sloping portions 60 include distal ends 74 which extend beyond and cantilever above leg members 62. Distal ends 74 include a central elongate edge 75, and a pair of mitered corner portions 76 adjacent each leg 62. Mitered corners 76 include a downwardly-turned edge 78, and elongate edge 75 includes a downwardly-turned edge 79. In this embodiment, as best shown in FIG. 4B, mitered corner portion 76 intersects elongate edge 75 at an angle A which is approximately equal to 30°. Central portion 58 of top shroud portion 52 includes an aperture 80 for receiving transducer cables 24 (described below), as well as three apertures 82 for receiving fasteners for attaching the lower electronics enclosure 18 to meter body 12 and top shroud portion 52.

Figure 6:
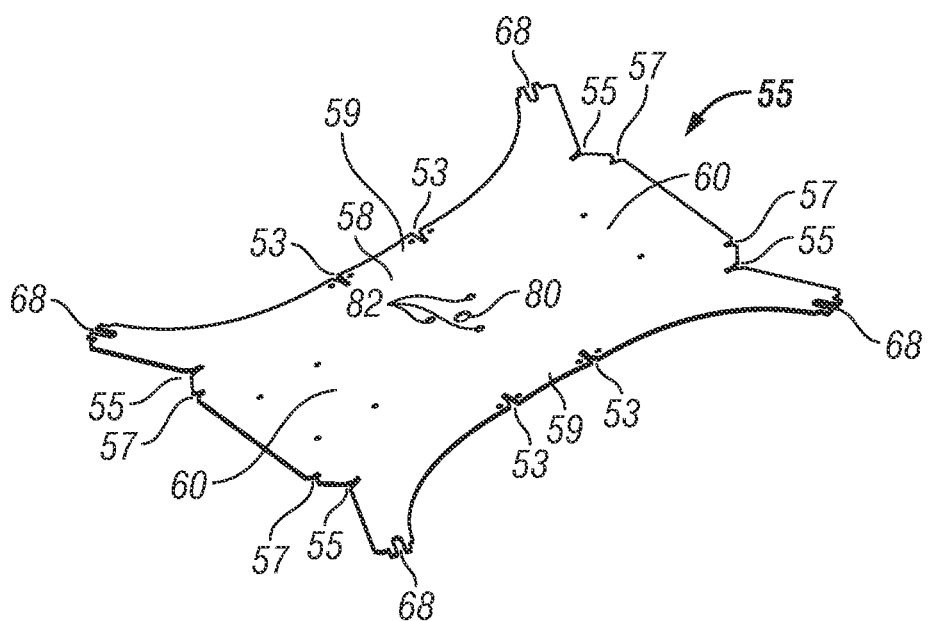
FIG. 6 is a perspective view of a sheet metal member adapted for use in forming the top sub-assembly shown in FIG. 5.

Top shroud portion 52 may be stamped, cut or otherwise formed from a single, unitary sheet of material, such as sheet 55 shown in FIG. 6, and then bent to form the top shroud portion 52. As shown, sheet 55 includes notches 53 allowing sheet 55 to be bent easily so as to define central portion 58 and sloping portions 60. Sheet 55 includes cable aperture 80 and fasteners apertures 82 formed in the central portion 58. Notches 53 further allow the sheet 55 to be bent in order to easily form lip 59. Similarly, notches 55 and 57 allow the sheet material 55 to be bent to form leg members 62 and downwardly-turned edges 78, 79 at the distal end 74 of the sloping portion 60.

Figure 8:
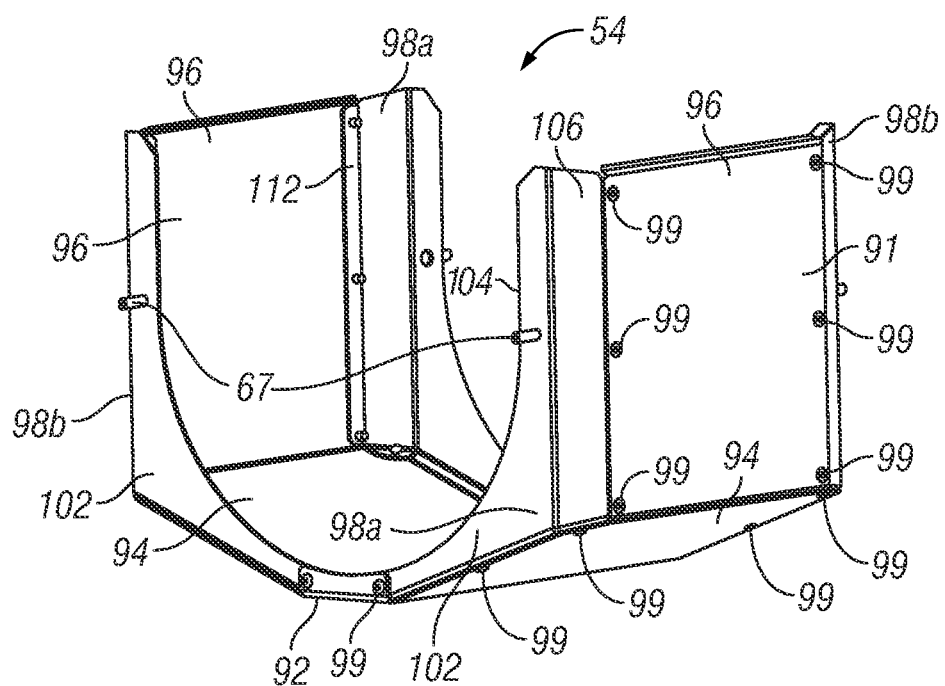
FIG. 8 is a perspective view of the bottom sub-assembly of the shroud assembly shown in FIG. 4A.
Figure 9:
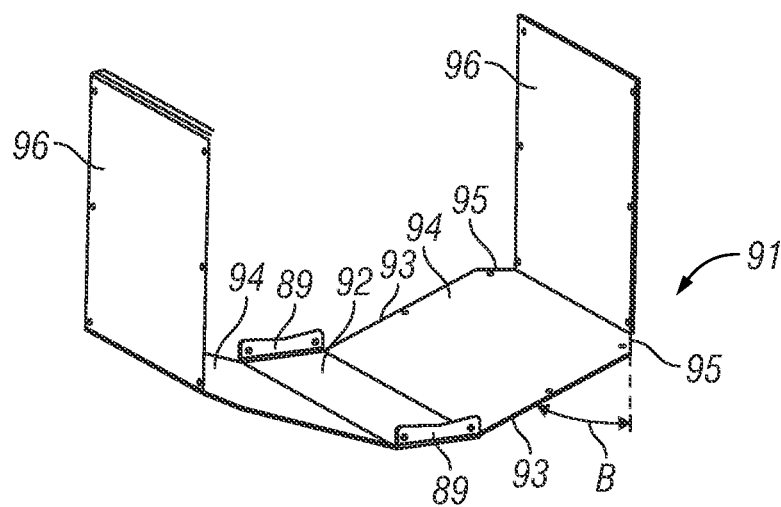
FIG. 9 is a perspective view of the central portion of the bottom sub-assembly shown in FIG. 8.

Referring now to FIGS. 4A, 8 and 9, bottom shroud portion 54 generally comprises a central portion 91 coupled to four corner members 98. Central portion 91 includes a base section 92 that includes upwardly-extending lips 89. Base section 92 is flanked by a pair of sloping bottom panels 94, and a pair of upwardly-extending end panels 96. Each sloping bottom panel 94 includes edge portion 93 and mitered corner portion 95 (best shown in FIG. 9). Each mitered corner portion 95 intersects edge 93 at angle B (approximately 60°) to correspond to mitered corners 76 of top shroud portion 52. Two corner members 98 interconnect each end panel 96 to a sloping bottom panel 94.

Figure 10:
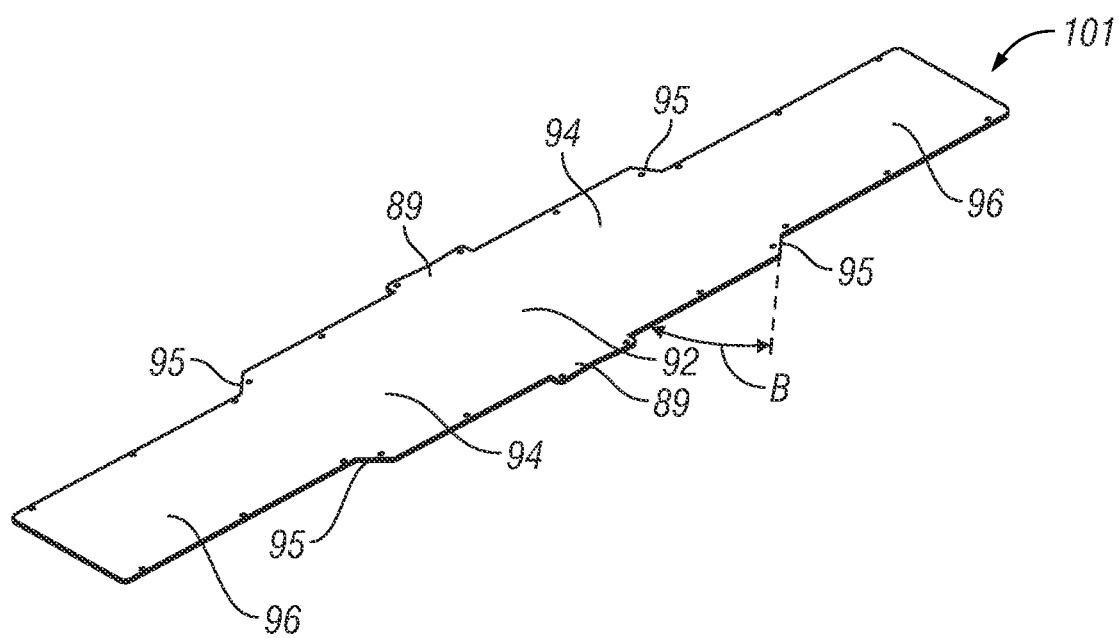
FIG. 10 is a perspective view of a sheet metal member adapted for use in forming the central portion of the bottom sub-assembly shown in FIG. 9.

Central portion 91 may be made from a single, unitary sheet of material such as sheet 101 shown in FIG. 10 that is then bent to shape. Sheet 101 may be stamped or cut by various techniques to provide a shape convenient for bending the material to form all of central portion 91 from a single sheet of material. Sheet 101 includes, at its widest point, material used to bend and form central portion 92 and lips 89, the mitered corners 95 of the sloping bottom panel 94, as well as the upwardly-extending end panels 96.

Figure 11A:
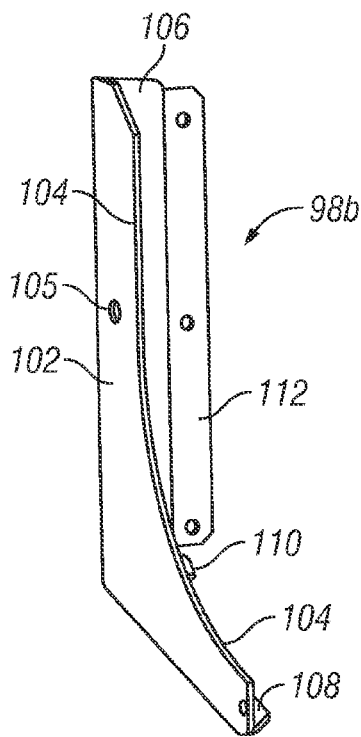
FIGS. 11A and 11B are perspective views of corner members of the bottom sub-assembly shown in FIG. 8.
Figure 11B:
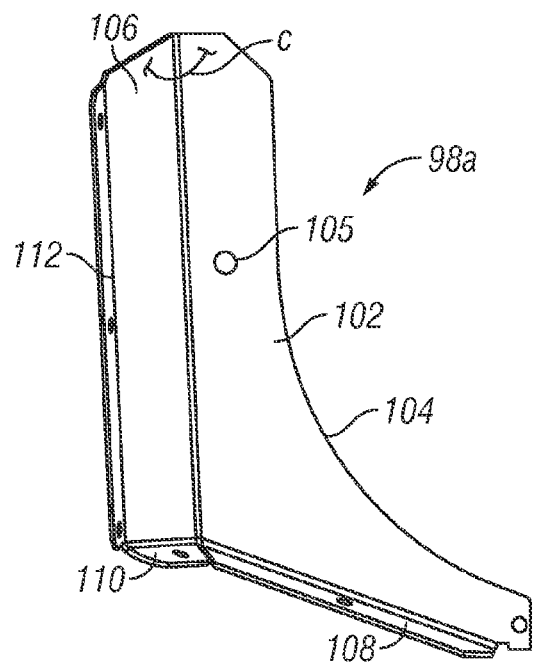

Bottom shroud portion 54 also includes two identically-formed corner members 98a, and two other corner members 98b that are identical to one another and are the mirror images of corner members 98a, as best shown in comparing FIGS. 11A and 11B. Each corner member 98a, as shown in FIG. 8 and FIG. 11B, includes an outwardly-facing and generally planar portion 102 having curved edge 104 and aperture 105. Each curved edge 104 forms one-quarter of the shroud's circular opening 56. Extending from planar portion 102 at an angle C equal to approximately 152° is corner portion 106. Planar portion 102 and corner portion 106 include lips 108, 110, respectively, that extend inwardly at an angle approximately 90° relative to planar portion 102 and corner portion 106. Corner portion 106 further includes an elongate lip 112.

Figure 12:
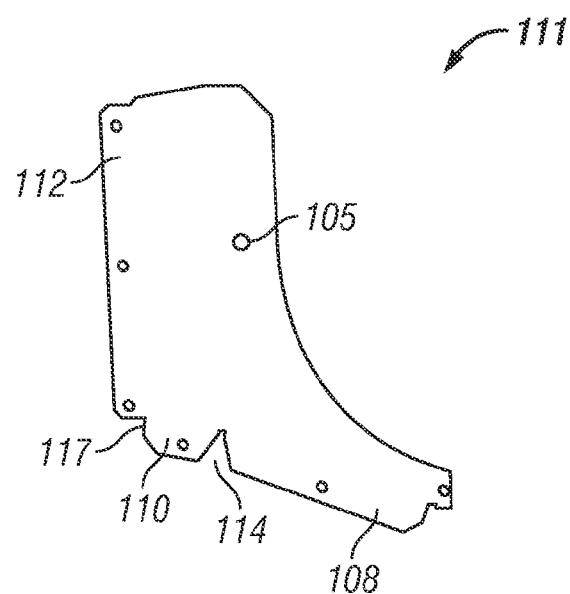
FIG. 12 is a perspective view of a sheet metal member adapted for use in forming each of the corner members shown in FIGS. 11A and 11B.

A single sheet of material 111 shown in FIG. 12 may be employed to form each corner member 98a, 98b. The sheet material 111 includes notches 114, 117 allowing the sheet material 111 to be bent easily to form lips 108, 110, as well as elongate lip 112.

Referring again to FIGS. 8, 9 and 11, each lip 112 of corner members 98 connects to upwardly extending end panel 96, and each lip 110 connects to the mitered corner portion 95 of sloping bottom panel 94, while lip 108 fastens to the elongate edge 93 of bottom panel 94. Before assembly of cable shroud 50, a threaded stud 67 is positioned within aperture 105 of each corner member 98a, 98b and is rigidly attached so that it extends substantially at a right angle from generally planar portion 102. As described below, threaded stud 67 is employed in releasably fastening bottom shroud portion 54 to top shroud portion 52. A commercially available fastener useful as threaded stud 67 is a PEM® stud which can be swaged into aperture 105, resulting in a permanent attachment of stud 67 to corner members 98a, 98b.

Referring to FIGS. 2, 3 and 15, a transducer 22 is retained within each transducer boss 34. Each transducer 22 threadably engages a threaded port 36 and is sealed to prevent fluid from escaping the body's central flow passage 16. A transducer cable 24 extends between transducer 22 and lower electronics housing 18, and electrically couples the transducer elements to electronics that are housed in lower electronics housing 18. In the embodiment shown, four such cables terminate in housing 18.

Referring to FIG. 13, lower electronics housing 18 includes bottom 115, sides 116 and top 117. Upper electronics housing 20 is supported by top 117. Bottom 115 is supported atop bosses 38 on the top of the meter body 12 (two such bosses and fasteners shown in FIG. 13). Bottom 115 also includes a first aperture 122 for receiving transducer cables 24, and includes three additional apertures 123 for receiving threaded fasteners 124. Apertures 123 are asymmetrically positioned to mirror the location of threaded bores 39 in bosses 38. Threaded fasteners 124 engage threaded bores 39 in bosses 38. Bosses 38 form standoffs maintaining clearance between meter body 12 and top shroud portion 52. Retained within lower electronics housing 18 are one or more circuit boards 128. Transducer cables 24 couple to terminals of circuit boards 128.

It is desirable that the lower electronics enclosure 18 be sealed in order to prevent ingress of moisture, water and dirt. Accordingly, during assembly, a gasket 130 of rubber or other elastomeric material is disposed between top shroud portion 52 and the bottom 115 of lower electronics housing 18. Further, an elastomeric, annular cable seal member 120 is provide in aperture 122 and seals between the electronics housing 18 and the entering transducer cables 24. In this embodiment, each of the four transducer cables 24 extends through cable aperture 80 of top shroud portion 52 and through cable seal member 120.

The tightening of fasteners 124 secures lower electronics housing 18 to meter body 12 with the top shroud portion 52 and gasket 130 sandwiched therebetween. The tightening of fasteners 124 compresses gasket 130. To prevent over-compression, each fastener 124 passes through a flat washer 134. The gasket 130 includes a hole at the location of each flat washer 134, with the diameter of the hole being slightly larger than the diameter of the washer 134. Washers 134 prevent over-compression of the gasket 130 while, at the same time, providing a rigid mounting of the lower electronics housing 18 to the meter body 12. Each fastener 124 passes through a shoulder washer 132. In this embodiment, washers 132 and 134 are made of plastic of other non-conducting material. The non-conducting gasket 130, washers 132 and 134 electrically isolate electronics housing 18 from the top shroud portion 52 which, in this embodiment, is made of a conducting metal. Each fastener 124 has a hexagon shaped head 126. Flat washer 132 is located between head 26 and shoulder washer 132 to protect shoulder washer 132 from damage during the tightening of fastener 124. In this embodiment, fastener 124 and washer 126 are both made of conducting metal. Shoulder washer 132 further electronically isolate electronics housing 18 from the fastener 124 and flat washer 126. Transducer cables 24, once inside enclosure 18, extend to and terminate on the appropriate terminals of circuit boards 128 such that, in a conventional manner, electrical signals generated by transducers 24 and conveyed to the circuit boards 128 can be processed by electronics within lower housing 18 or upper housing 20.

During assembly of flow meter 10, transducer cables 24 are fed into and through the aperture 80 in central portion 58 of top shroud portion 52 through cable seal member 120. Assembly continues by lowering the top shroud portion 52 onto body 12, keeping the semicircular edges 65 of each end within the body grooves 40. Top shroud portion 52 is positioned on body 12 such that each semicircular edge 65 is positioned within a groove 40 of the meter body 12, and such that apertures 82 are aligned with threaded openings 39 in bosses 38. Gasket 130, cable seal 120, and fasteners 124 are positioned installed as described above, and the fasteners 124 tightened, securing the lower electronics housing 18 and top shroud portion 52 to the body 12.

Prior to the installation of the bottom shroud portion 54 onto body 12, the four corner members 98a, 98b are attached to central portion 91 of bottom shroud portion 54 by fasteners 99, which, in this embodiment are rivets; however, other fasteners or fastening means may be employed which, depending on the materials from which the shroud 50 is made, may be screws, clips, adhesives, or welding, as examples. The assembly process then proceeds with the lower body shroud portion 54 being moved upward and toward the top shroud portion 52 already coupled to meter body 12 and lower electronics housing 18. Curved edges 104 of each corner member 98a, 98b are disposed within an annular groove 40 in body 12. In this embodiment, the bottom shroud portion 54 fits below and within the top shroud portion and is secured to the top portion 52 at only four points and by only four fasteners. Downwardly-extending legs 62 and downwardly extending edges 78, 79 extend over and capture bottom shroud portion 54.

Assembly of the cable shroud 50 is complete when the curved edges 65 and 104 of top and bottom shroud portions 52, 54 are engaged within the body groove 40 at each end, and when the four threaded studs 67 of the bottom shroud portion 54 are aligned with and disposed within the notch 68 of each leg 62 of top shroud portion 52.

As best shown in FIGS. 4A and 15, the legs 62 of the top shroud portion 52 overlap the bottom shroud portion 54. This overlapping fit aids in the assembly and the rigidity of the total shroud assembly. Assemblies of relatively thin material, such as sheet metal, may tend to be somewhat inexact in manufacture and the materials and design of the shroud 50 allows bending of sheet material to the desired shape and position. The bends in the top and bottom shroud portions 52, 54 tend to have enough elasticity or spring effect to enable the portions to fit within one another, despite manufacturing variations that may exist. With the guidance of the body grooves 40 in meter body 12, and with the overlapping surfaces of shroud portion 52, 54, the assembly of shroud 50 is simplified. The body grooves 40 and overlapping lips and edges provide guidance as the parts come together, and help maintain alignment of the parts as they are then fastened. Without the body grooves 40 and the overlapping of the top and bottom shroud portions 52, 54, assembly of shroud 50 would be more difficult.

Figure 14A:
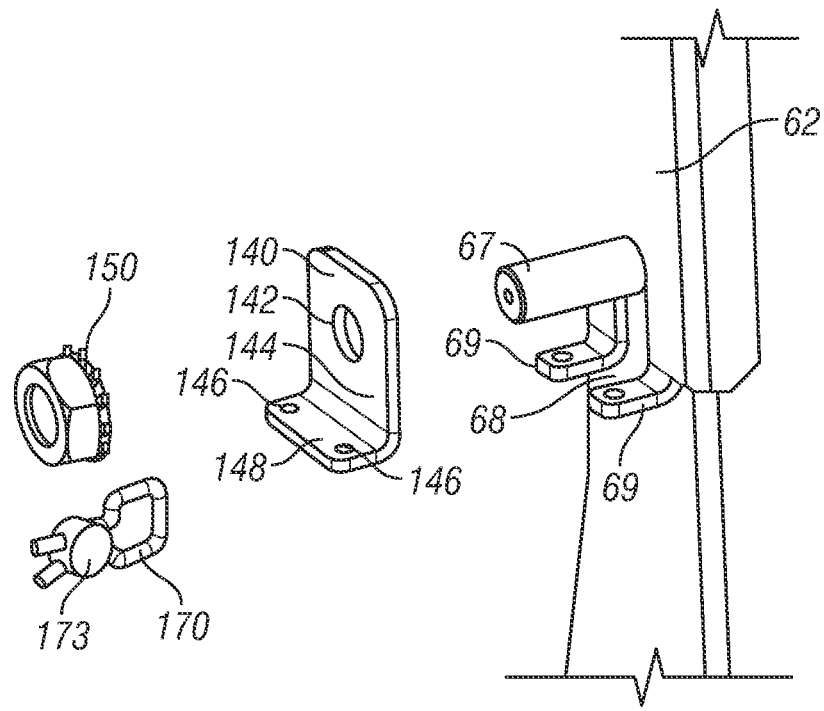
FIG. 14A is an enlarged, exploded view, in perspective, showing fasteners for attaching the top shroud sub-assembly of FIG. 5 to the bottom shroud sub-assembly of FIG. 8.
Figure 14B:
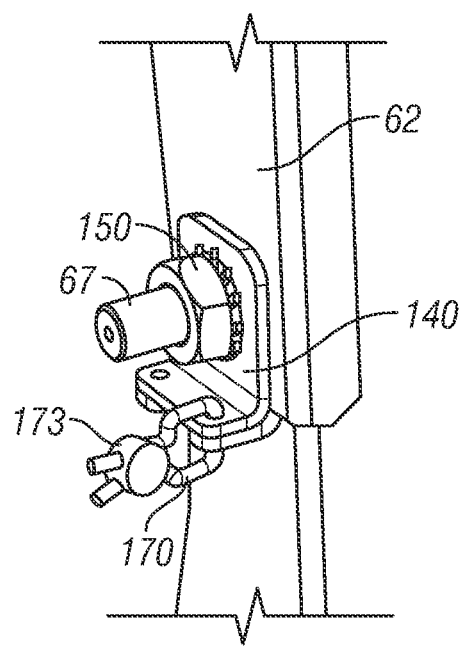
FIG. 14B is an enlarged, perspective view showing the fasteners of FIG. 14A connecting together the top and bottom shroud sub-assemblies.

Referring to FIGS. 14A and 14B, with the studs 67 on the bottom shroud portion 54 fully engaged within the corresponding notch 68 in the top shroud portion 52, and with the curved edges 65 and 104 of both shroud portions 52, 54 disposed within the annular grooves 40, a securing clip 140 is disposed on each stud 67. As shown, each securing clip 140 is an angled member having a stud-receiving aperture 142 formed on an upwardly extending portion 144, and having two smaller apertures 146 on the base portion 148 of the clip. Clip 140 is disposed on the stud 67 such that the base portion 148 rests against and atop tabs 69 of leg members 62. Once so positioned, a locking nut or other fastener 150 threads onto the stud 67 to fasten the clip 140 in place which, in turn, couples together the top and bottom shroud portions 52, 54. In this embodiment shown, the locking fastener 150 is a KIPS® nut which includes a lock washer to prevent loosening of the connection.

To provide a visual indication of whether any portion of the shroud 50 has been removed, as would be required in order to access a transducer 22 or cable 24, an anti-tamper seal 170 is provided. The anti-tamper seal 170 includes a wire that passed through aligned holes 77 (in tabs 69) and holes 146 that are in clip 140 and loops back to a lead seal 173. When the lead seal is compressed, the wire is secured. In order to lower or remove bottom shroud portion 54 from top shroud portion 52, the wire or lead seal of the anti-tamper seal 170 must be broken.

With the shroud 50 fully enveloping the body 12, cable chamber 13 is formed and provides substantial protection to the transducer cables 24 and to the transducers 22 themselves. With the shroud 50 in place, cables 24 are protected during shipping, installation and use. Further, the transducer cables 24 are not exposed to direct, harsh, sunlight and other effects of weather, which could cause the cable insulation to degrade. Further still, the shroud 50 protects the cables from being pulled loose, or otherwise displaced by, for example, foraging animals or by vandals. Because the cables 24 are completely enclosed in chamber 13 and thus not susceptible to such damage, less robust and less expensive cables can be employed than would otherwise by the case if the cables were continuously exposed to weather, animals, and potential mishap. Finally, because the transducers 22 themselves are covered and not exposed to weather, less expensive transducer cable end seals may be employed than if the transducer ends were exposed to the elements.

When inspection or maintenance is required to be performed on the transducers 22, the embodiment described above requires only that the bottom shroud portion 54 be lowered after removal of two of the four retaining clips 140. As best show in FIG. 15, removal of two clips 140 allows the compliant lower should portion 54 to be manipulated from a first position in which it engages top shroud portion 52 and in which cable chamber 13 is closed, to a second position in which it is out of engagement with top shroud portion 52, thereby providing an access port or opening 15 into cable chamber 13.

The four mitered corners 76 provide clearance and allow for the transducers 22 to be removed without requiring the loosening or removal of the top shroud subassembly 52. Accordingly, the transducers 22 can be serviced without disturbing the assembly of the electronics enclosure 18 to the body 12. This is achieved, in part, by providing the mitered corners 76, which allow a wrench or other tool to access the transducers 22 (see FIG. 15) and also for the transducer 22 to be removed axially from the transducer ports 36. Without the mitered corner 76, the top shroud portion 52 would interfere with the path of the transducer 22 as it is being removed from the transducer ports 36. Further, for a transducer 22 that includes a cable 24 having a cable connector 25 (FIG. 15), the connector 25 is positioned between the lower edges of top shroud portion 52 and the transducer boss 34. This arrangement makes cable connector 25 easily accessible and provides a means allowing cable segment 24a to be disconnected from cable segment 24b to allow transducer 22 to be replaced without having to remove or otherwise disturb the assembly of electronics enclosure 18 to body 12.

As best shown in FIG. 4B, the mitered corners 76 and 95 provide shroud 50 with an 8-sided, non-rectangular profile when viewed from above top shroud portion 52 and from below bottom shroud portion 54. Similarly, in this embodiment, shroud 50 also has an 8-sided, non-rectangular profile when viewed along the longitudinal axis 17 of meter body 12 (FIG. 1)—a direction perpendicular to facing surface 63 of legs 62 (FIG. 5). This results from the angles made by the intersection of sloping portions 60 with central portion 58 of the top shroud portion 52, and the angles made by the intersection of sloping bottom panels 94 with base section 92 of the bottom shroud portion 54. The mitered corners 76, 95 and the resulting 8-sided, non-rectangular shape of the shroud 50 permit the elongate transducers 22 to be unthreaded from port 36 and removed without interference from the shroud 50 as might be caused by a rectangular-shaped enclosure, one without mitered corners.

The shroud 50 described herein further provides tamper-resistance, as well as an indication if the shroud 50 has been disassembled or had portions removed. In particular, the assembly described herein provides for the installation of one or more anti-tamper seals 170. With the transducers 22 and transducer cables 24 completely covered by shroud 50, these components are inaccessible when the shroud 50 is installed on the meter body 12. In order to access these components, the bottom shroud portion 54 would have to be removed or repositioned. To accomplish such access, at least some of the anti-tamper seals 170 would have to be broken, which would provide a visual indication that tampering may have occurred. As described above, it is preferable that at least two such anti-tamper seals 170 be provided; however, even providing one such seal 170 could provide indication that the shroud has been moved and/or the transducers accessed.

While preferred embodiments have been shown and described, modifications thereof can be made by one skilled in the art without departing from the scope or teachings herein. The embodiments described herein are exemplary only, and are not limiting. Many variations and modifications of the disclosed apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A flow meter, comprising:
   a meter body;
   a shroud disposed about said meter body and comprising at least a first shroud portion and a second shroud portion;
   a chamber between said shroud and said meter body;
   an enclosure coupled to said meter body and adapted for housing electronics;
   wherein said first shroud portion is disposed between said enclosure and said meter body; and said second shroud portion is releasably attached to said first shroud portion.

2. The flow meter of claim 1 wherein said enclosure includes an aperture that is generally aligned with an aperture in said shroud, said flow meter further comprising:
   a transducer assembly coupled to said meter body; and
   a cable coupled to said transducer and extending from said transducer into said enclosure, said transducer cable disposed through said aligned apertures in said enclosure and said shroud.

3. The flow meter of claim 1 wherein at least one of said first and second shroud portions is a compliant member.

4. The flow meter of claim 3 wherein said compliant member is made of sheet metal.

5. The flow meter of claim 2 wherein said shroud comprises a mitered corner adjacent to the location where said transducer is coupled to said meter body.

6. The flow meter of claim 1 further comprising:
a bottom on said enclosure;
standoffs on said meter body extending into said chamber and supporting said first shroud portion; and
fasteners extending through said enclosure bottom and through said first shroud portion and into said standoffs.

7. The flow meter of claim 1 further comprising:
a plurality of removable fasteners attaching together said first and second shroud portions; and
an anti-tamper seal coupled to at least one of said first and second shroud portions and adapted to provide an observable indication upon said first and second shroud portions becoming unattached.

8. The flow meter of claim 5 wherein said shroud includes a pair of generally circular apertures and generally circular edges along the perimeter of said apertures; and
wherein said meter body extends through said apertures, and further includes a pair of annular grooves capturing said generally circular edges of said shroud.

9. The flow meter of claim 1 further comprising:
a plurality of removable fasteners attaching together said first and second shroud portions; and
wherein said second shroud portion is movable from a closed position to an opened position with the removal of at least one of said removable fasteners, said chamber being closed when said second shroud portion is in the closed position and being open when said second shroud portion is in said opened position.

10. A flow meter, comprising:
a meter body having an outer surface and an inner surface, the inner surface forming a flow passage through said meter body;
a compliant cover enveloping said meter body and including a first and second aperture generally coaxially aligned, wherein said meter body extends through each of said apertures and extends outside said compliant cover; and
a chamber outside said flow passage and between said compliant cover and said outer surface of said meter body;
said compliant cover comprising at least a first portion coupled to said meter body.

11. The flow meter of claim 10 further comprising:
grooves in said outer surface of said meter body, and wherein said apertures in said cover have circular edges that are disposed in said grooves.

12. The flow meter of claim 10 wherein at least a first shroud portion is formed from a unitary piece of sheet metal.

13. The flow meter of claim 10 wherein said compliant cover further comprises a second portion releasably coupled to said first portion, said second shroud portion including a pair of upwardly-extending end panels; and
wherein said first shroud portion is disposed above said second shroud portion and includes downwardly-turned edges that are disposed over said upwardly-extending end panels.

14. The flow meter of claim 13 wherein said shroud comprises mitered corners adjacent said end panels, and wherein said shroud has an 8-sided shape when viewed from above said first shroud portion.

15. The flow meter of claim 10 wherein said compliant cover further comprises a second portion releasably coupled to said first portion, said first shroud portion including at least one leg having a notch in the leg end, and wherein said second shroud portion includes a stud extending through said notch, said flow meter further comprising a fastener disposed on said stud and retaining said leg in engagement with said second shroud portion.

16. A flow meter, comprising:
a meter body;
a shroud disposed about said meter body and comprising at least a first shroud portion and a second shroud portion, said first shroud portion coupled to said meter body;
wherein said second shroud portion is coupled to said first shroud portion and movable between at least a first position in which said shroud forms a closed chamber between said shroud and said meter body, and a second position in which said chamber includes an opening for access into said chamber.

17. The flow meter of claim 16 further comprising:
an enclosure having a bottom coupled to said meter body and adapted for housing electronics;
standoffs on said meter body and supporting said first shroud portion; and
fasteners extending through said enclosure bottom and through said first shroud portion and into said standoffs.

18. The flow meter of claim 16 further comprising:
a plurality of removable fasteners attaching together said first and second shroud portions; and
an anti-tamper seal coupled to at least one of said first and second shroud portions and adapted to provide an observable indication upon said first and second shroud portions becoming unattached.

19. The flow meter of claim 16 wherein said first shroud portion includes at least one leg having a notch in the leg end, and wherein said second shroud portion includes a stud extending through said notch, said flow meter further comprising a fastener disposed on said stud and retaining said leg attached to said second shroud portion.

20. The flow meter of claim 19 further comprising an anti-tamper seal coupled to at least one of said first and second shroud portions and adapted to provide an observable indication upon said first and second shroud portions becoming unattached.

21. The flow meter of claim 16 wherein said shroud includes a pair of generally circular apertures and generally circular edges along the perimeter of said apertures; and
wherein said meter body extends through said apertures, and further includes a pair of annular grooves capturing said generally circular edges of said shroud.

22. A flow meter, comprising:
a meter body having a through bore for conducting fluid therethrough and having an outer surface and a pair of circumferential grooves of radius R on said outer surface that are spaced apart from one another a predetermined distance;
a shroud assembly disposed about said body;
a chamber between said shroud assembly and said meter body;
a transducer coupled to said meter body and including a cable extending into said chamber;
wherein said shroud assembly comprises:
a first shroud portion having a first curved edge of radius R disposed in a first of said grooves, and a second curved edge of radius R disposed in said second of said grooves; and
a second shroud portion having a first curved edge of radius R disposed in said first of said grooves, and a second curved edge of radius R disposed in said second of said grooves.

23. The flow meter of claim 22 further comprising at least one fastener releasably coupling said first and second shroud portions.

24. The flow meter of claim 23 further comprising a sealed enclosure coupled to said meter body and adapted for housing electronics;
   wherein said first shroud portion is disposed between said enclosure and said meter body; and said second shroud portion is releasably attached to said first shroud portion.

25. The flow meter of claim 24 wherein said cable extends from said transducer into said enclosure, said transducer cable being disposed through aligned apertures formed in said enclosure and said first shroud portion.

26. The flow meter of claim 22 wherein said flow meter comprises at least a pair of transducers coupled to said meter body, and wherein said shroud assembly comprises mitered corners adjacent to the locations where said transducers are coupled to said meter body.

27. The flow meter of claim 24 wherein said shroud assembly has an 8-sided shape when viewed from above said first shroud portion.

28. The flow meter of claim 23 further comprising an enclosure coupled to said meter body and adapted for housing electronics, and wherein said meter body comprises a plurality of bores for receiving fasteners that couple said enclosure to said meter body, said bores being formed on said meter body in an asymmetric pattern.

* * * * *